United States Patent
Bush

(10) Patent No.: US 7,187,400 B2
(45) Date of Patent: Mar. 6, 2007

(54) METHOD AND APPARATUS FOR COMPENSATING FOR IMAGE MISALIGNMENT DUE TO VARIATIONS IN LASER POWER IN A BI-DIRECTIONAL RASTER IMAGING SYSTEM

(75) Inventor: Craig Palmer Bush, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 274 days.

(21) Appl. No.: 11/000,835

(22) Filed: Dec. 1, 2004

(65) Prior Publication Data

US 2006/0114309 A1   Jun. 1, 2006

(51) Int. Cl.
 *B41J 2/47*   (2006.01)
 *G03G 15/043*   (2006.01)
(52) U.S. Cl. ...................................... 347/250; 347/235
(58) Field of Classification Search ................ 347/235, 347/250
See application file for complete search history.

(56) References Cited

U.S. PATENT DOCUMENTS

| 5,966,231 A * | 10/1999 | Bush et al. ................. 359/204 |
| 2005/0134679 A1* | 6/2005 | Paterson et al. ............ 347/250 |
| 2006/0064019 A1* | 3/2006 | Bush et al. ................. 600/476 |

* cited by examiner

*Primary Examiner*—Huan Tran
(74) *Attorney, Agent, or Firm*—Frederick H. Gribbell, LLP.

(57) ABSTRACT

A bi-directional electrophotographic raster imaging system that sweeps a modulated light beam across an imaging region of a photosensitive surface to create both forward-going and reverse-going scanlines of dot data on the imaging region, and which compensates for image misalignment that may be caused by varying the power used to drive a laser light source that generates the modulated light beam. An SOS photosensor detects the beginning of each scanline in both forward and reverse directions, outputting an SOS signal used to create both forward and reverse margins. When the laser power is varied, compensating data is used to correct the forward and reverse margins to keep them aligned (straight), even though the beginning of the scanline locations for both forward and reverse scans are affected in opposite directions by an increase or decrease in laser power.

23 Claims, 4 Drawing Sheets

METHOD AND APPARATUS FOR COMPENSATING FOR IMAGE MISALIGNMENT DUE TO VARIATIONS IN LASER POWER IN A BI-DIRECTIONAL RASTER IMAGING SYSTEM

TECHNICAL FIELD

The present invention relates generally to image forming equipment and is particularly directed to bi-directional raster imaging systems of the type that create image data on a photosensitive surface. The invention is specifically disclosed as an electrophotographic image forming apparatus that sweeps a modulated light beam across an imaging region of a photosensitive surface to create both forward-going and reverse-going scanlines of dot data on the imaging region, and which compensates for image misalignment that may be caused by varying the power used to drive a laser light source that generates the modulated light beam.

BACKGROUND OF THE INVENTION

Typical raster imaging systems for electrophotographic printers use a start-of-scan (SOS) signal to indicate when the laser beam is at a known position within the scanline. The SOS signal asserts when the laser beam has stimulated a detection or position sensor's photoelectric material beyond a characteristic threshold level. Once the imaging system receives the SOS signal, it then relies on a known time-to-distance relationship to properly position the image data across the scanline.

Raster imaging systems such as laser printers often feature several different darkness levels to meet the printing requirements of a wide variety of customers. One way to achieve these different darkness levels is to vary the current through the laser, which in turn varies the laser's output power. However, changes in the laser power will affect the scan position of the laser with respect to when the SOS signal is asserted by the SOS photosensor. The greater the laser power, the earlier the SOS signal is asserted (or output) because the SOS sensor's photoelectric material reaches the detection threshold sooner. This effect results in the image shifting toward the start of the scan, because the imaging system sees the SOS signal when the laser beam is positioned earlier in the scanline than it was before any increase in the laser power. This shift is not noticeable in systems that rasterize in a single direction, because every scan will shift in the same direction and by the same amount, thereby preserving the scan-to-scan alignment. However, this type of shift may be noticeable in bi-directional raster systems because the shift for scans rasterized during the laser beam's reverse travel is in the opposite direction as compared to scans that are rasterized during the laser beam's forward travel. This results in a misalignment between the forward and reverse scans of the image.

SUMMARY OF THE INVENTION

Accordingly, it is an advantage of the present invention to provide a system that compensates for variations in laser power to reduce or eliminate misalignment between the margins in forward and reverse scans of the image.

It is another advantage of the present invention to ensure proper scan-to-scan alignment in a bi-directional raster imaging system that can operate at different levels of laser power.

It is yet another advantage of the present invention to provide an imaging system that calculates an offset to be applied to a nominal margin setting, in which the offset is based on the difference in laser power between the current laser power and the laser power that was used when the nominal margin setting was determined.

It is still another advantage of the present invention to provide an imaging system that uses a lookup table to determine an appropriate offset that can be applied to a nominal margin setting, based on the difference in laser power between the current laser power and the laser power that was used when the nominal margin setting was determined.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for compensating for image misalignment in a bi-directional electrophotographic image forming system is provided, in which the method comprises the following steps: (a) providing a processing circuit and a memory circuit for controlling an image forming apparatus, the image forming apparatus having: (i) a light source that generates a moving light beam that scans across an imaging area of a photosensitive image forming surface, the imaging area having a first edge and a second, opposite edge in at least one scanning direction, and (ii) at least one light-detecting sensor that receives the moving light beam at a location other than at the image forming surface; (b) storing data in the memory circuit corresponding to a first nominal margin of the photosensitive image forming surface, in which the first nominal margin corresponds to a nominal power setting for the light source, and in which the first nominal margin is related to a first time interval between: (i) when a first electrical signal is output from the at least one light-detecting sensor as it is stimulated by the moving light beam traveling in a first scanning direction of the at least one scanning direction; and (ii) when the first edge of the imaging area is reached by the moving light beam, while traveling in the first scanning direction; (c) storing data in the memory circuit corresponding to a second nominal margin of the photosensitive image forming surface, in which the second nominal margin corresponds to the nominal power setting for the light source, and in which the second nominal margin is related to a second time interval between: (i) when a second electrical signal is output from the at least one light-detecting sensor as it is stimulated by the moving light beam, traveling in a second scanning direction of the at least one scanning direction, which is substantially opposite the first scanning direction; and (ii) when the second, opposite edge of the imaging area is reached by the moving light beam, while traveling in the second scanning direction; (d) determining compensating data to be used with the first and second nominal margins, when the light source is operating at a power setting other than the nominal power setting; and (e) when needed, applying the compensating data to the first nominal margin to generate a first corrected margin, and applying the compensating data to the second nominal margin to generate a second corrected margin.

In accordance with another aspect of the present invention, an image forming system is provided, which comprises: (a) a light source that generates a moving light beam which scans across an imaging area of a photosensitive image forming surface, the imaging area having a first edge and a second, opposite edge in at least one scanning direction; (b) at least one light-detecting sensor that receives the moving light beam at a location other than at the image forming surface; (c) a memory circuit for storing data that corresponds to a first nominal margin of the photosensitive image forming surface, in which the first nominal margin corresponds to a nominal power setting for the light source, and in which the first nominal margin is related to a first time interval between: (i) when a first electrical signal is output from the at least one light-detecting sensor as it is stimulated by the moving light beam traveling in a first scanning direction of the at least one scanning direction; and (ii) when the first edge of the imaging area is reached by the moving light beam, while traveling in the first scanning direction; (d) the memory circuit also being configured for storing data that corresponds to a second nominal margin of the photosensitive image forming surface, in which the second nominal margin corresponds to the nominal power setting for the light source, and in which the second nominal margin is related to a second time interval between: (i) when a second electrical signal is output from the at least one light-detecting sensor as it is stimulated by the moving light beam, traveling in a second scanning direction of the at least one scanning direction, which is substantially opposite the first scanning direction; and (ii) when the second, opposite edge of the imaging area is reached by the moving light beam, while traveling in the second scanning direction; and (e) a processing circuit that is configured: (i) to determine compensating data to be used with the first and second nominal margins, if the light source is operating at a power setting other than the nominal power setting; and (ii) when needed, to apply the compensating data to the first nominal margin to generate a first corrected margin, and to apply the compensating data to the second nominal margin to generate a second corrected margin.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
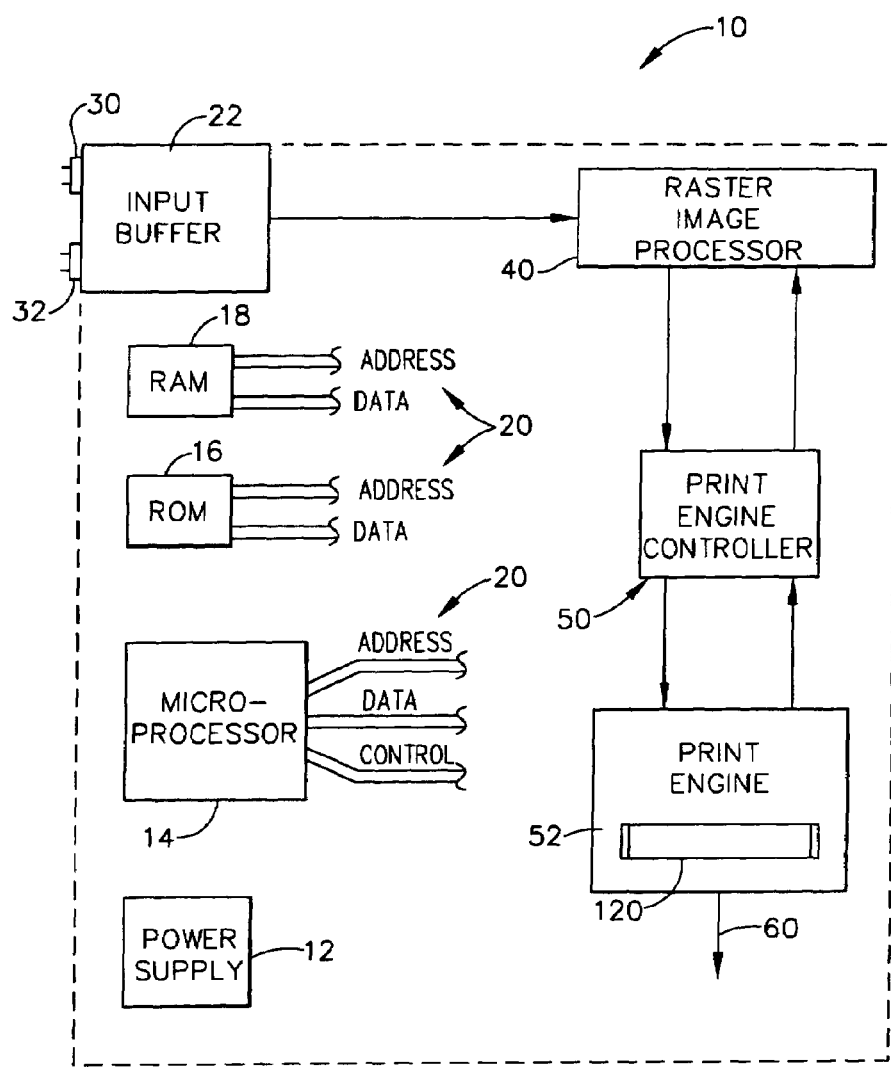
FIG. 1 is a block diagram of some of the major components of an electrophotographic (EP) printer, as constructed according to the principles of the present invention.

As stated above, the present invention relates to bi-directional raster imaging systems that create image data on a photosensitive surface, more particularly to an electrophotographic image forming apparatus that sweeps a modulated light beam across an imaging region of a photosensitive surface to create both forward-going and reverse-going scanlines of dot data on the imaging region. The invention compensates for image misalignment that may be caused by varying the power used to drive a laser light source that generates the modulated light beam.

The present invention can be used with a photoconductive drum (PC drum) as the photosensitive surface, and the laser beam that scans across the imaging region sweeps in both directions across the PC drum as it lays down image data. A start-of-scan (SOS) photosensor is used to detect the beginning of each scanline in a forward direction, which outputs a signal that prepares the raster imaging control system to begin laying modulated data onto the PC drum's imaging region after a predetermined time delay that corresponds to a distance that the sweeping laser light beam will move to create a "forward" margin (which is also referred to herein as the "left margin", assuming the forward scanline sweeps from left-to-right). To achieve this result, the "forward" SOS sensor would be placed so as to intercept the forward scanline laser light beam just before it begins to write modulated image data across the PC drum in the forward direction. The SOS sensor's output signal is sometimes referred to as an HSYNC signal, or a "horizontal synchronizing" signal.

Since the laser beam will also sweep across the imaging region of the PC drum in the opposite, reverse direction, some type of HSYNC signal is also desired to let the raster imaging system know that a reverse scanline is about to be laid down on the PC drum. A second start-of-scan (SOS) sensor can be used for this function, if desired, or a mirror can be used. In either case, the "reverse SOS sensor" or the mirror would be placed so as to intercept the reverse scanline laser light beam just before it begins to write modulated image data across the PC drum in the reverse direction. If a mirror is used, the intercepted laser beam is re-directed to the other SOS sensor (i.e., the "forward" SOS sensor) so that an output signal will be generated for use as the reverse SOS signal. In both cases, a reverse SOS signal (or a reverse HSYNC signal) is generated to prepare the raster imaging control system to begin laying modulated data onto the PC drum's imaging region after a predetermined time delay that corresponds to a distance that the sweeping laser light beam will move to create a "reverse" margin (which is also referred to herein as the "right margin", assuming the reverse scanline sweeps from right-to-left).

In many (or most) laser printers, the laser power can be varied to compensate for varying environmental conditions if desired (for changes in ambient temperature or humidity, for example); moreover, the laser power can be varied by user settings for increase or decrease the "darkness" of the printed output on the print media. Regardless as to the reason for changing the laser power from its initial (or default) settings, any such variation in the laser power will have an effect on the position that the modulated laser light will begin laying image data on the imaging region of the PC drum—in other words, the margin distance will be affected. If the laser power is increased, for example, then the photosensor used to generate the SOS signal will typically reach its characteristic switching threshold sooner, and therefore, output its SOS signal somewhat earlier than it would have, had the laser power not been changed.

In unidirectional scanning laser printers, such a shift in the margin would be equal for all scanlines in the same direction, and thus this shift would not be noticeable. However, in a bi-directional scanning laser printer, the shift in the margin would be in one direction for the forward scan, but in the opposite direction for the reverse scan, and thereby possibly become noticeable. The present invention compensates for these margin variations due to an adjustment or change in the laser power, so that the left and right margins will end up in a substantially aligned position on the PC drum's imaging region.

The raster image processing control system stores information in memory relating to the nominal laser power used to set up the printer at the factory, and also stores information relating to the nominal left margin and nominal right margin distances, which occur at the nominal laser power. The control system also contains "correction" or "compensation" information that will be used in the event that the laser power is altered after factory set-up. If the margin needs to be increased, then the compensation information will provide a numeric value (e.g., from a lookup table) to be added to the margin data; or in an alternative mode, the compensation information provide a transfer function to calculate the amount to be added to the margin data. Of course, of the margin is to be decreased, then the compensation information would provide negative numbers to be "added" to the margin.

Both the forward and reverse scans would have their margins adjusted, to that the "ending" pixel of a forward scan will line up (in the sub-scanning direction) with the "starting" pixel of a reverse scan (e.g., at the right margin). Similarly, the "ending" pixel of a reverse scan will line up (in the sub-scanning direction) with the "starting" pixel of a forward scan (e.g., at the left margin). The principles of the present invention can be used with all types of bi-directional EP printers, not only the galvanometer-based laser printers manufactured by Lexmark International, Inc.

Reference will now be made in detail to the present preferred embodiment of the invention, an example of which is illustrated in the accompanying drawings, wherein like numerals indicate the same elements throughout the views.

The present invention provides a method for ensuring proper scan-to-scan alignment in a bi-directional raster imaging system that may operate with different levels of laser power in a laser print engine. In one described embodiment, the imaging system calculates an offset that will be applied to the nominal margin setting, based on the difference in laser power between the current laser power and the "original" laser power that was used when the nominal margin was determined at the factory set-up of the printer. In another embodiment, the imaging system uses a lookup table to determine the appropriate offset that will be applied to the nominal margin setting.

A bi-directional raster imaging system such as a galvanometer-based laser printer requires two start-of-scan (SOS) signals, one each for the forward direction and the reverse direction of the laser beam travel. Such galvanometer-based laser printers have been described in earlier patent applications that have been commonly assigned to Lexmark International, Inc. These other patent applications are as follows: patent application Ser. No. 10/327,851, filed on Dec. 23, 2002, and titled "Scanning with Feedback Sensor;" and, patent application Ser. No. 10/329,084, filed on Dec. 23, 2003, and titled "Bi-Directional Galvonometric Scanning and Imaging," and are incorporated herein by reference in their entirety.

Upon receiving a start-of-scan signal, the imaging system rasterizes data according to a time-to-distance profile that is appropriate for that direction of laser beam travel. Regardless of the direction of laser beam travel, the time-to-distance profile includes a portion corresponding to the interval when the laser beam travels from the SOS position to the physical location of the first pixel of the print scan. The laser typically is off during this part of the scan, which is often referred to as the left margin or the right margin, depending on the direction of laser beam travel. For the purposes of this description, the "left margin" occurs after the "forward" start-of-scan signal, and the "right margin" occurs after the "reverse" start-of-scan signal.

Mechanical tolerances in the raster imaging system require that these margins be programmable in order to ensure that the image is correctly positioned on the page. These margins typically are set on the manufacturing line, and are set using a default or a nominal laser power setting. All images subsequently printed using that laser power setting should then have proper alignment between forward and reverse scans. However, any images printed with a different laser power setting will likely be misaligned by an amount proportional to the difference between the current laser power setting and the nominal laser power setting used when the margins were set. The reason for this misalignment lies in the operational characteristic of the SOS sensor typically used in laser printers and in other raster image systems (e.g., other types of electrophotographic printing systems). A typical photosensor asserts the SOS signal when the amount of energy it has received from the laser beam reaches a switching threshold value. If the laser power has been increased, the photosensor will reach this threshold in less time as compared to the nominal case. Similarly, it takes longer than the nominal time if the laser power has been decreased. The difference in the SOS signal time with respect to the nominal SOS signal time translates into a difference in the laser's physical position in the scanline when the raster imaging system receives the start-of-scan signal.

Referring now to the drawings, FIG. 1 is a hardware block diagram generally showing some of the main components of an electrophotographic (EP) printer, generally designated by the reference numeral 10. Printer 10 contains an electrical power supply 12, which typically receives AC voltage and outputs one or more DC voltages. The printer 10 may also contain some type of processing circuit, such as a microprocessor or microcontroller 14, which typically has at least one address bus, one data bus, and perhaps one control bus or set of control signal lines, all generally designated by the reference numeral 20.

Such a laser printer 10 may also contain memory elements, such as read only memory (ROM) 16 and random access memory (RAM) 18, which also would typically be in communication with an address bus and data bus, and typically connected through the buses 20 to the microprocessor or microcontroller 14.

Most printers receive print jobs from an external source, and in printer 10 there typically would be an input buffer 22 to receive print data, usually through at least one input port, such as the ports 30 and 32. In modern printers, a typical input port could be a USB port or a network ETHERNET port, but also other types of ports can be used, such as parallel ports and serial ports. The input buffer 22 can be part of the overall system RAM 18, or it can be a separate set of memory elements or data registers, if desired.

The print job data will leave the input buffer 22 and in many modern printers, the data is sent to an application specific integrated circuit (ASIC), generally designated by the reference numeral 40 on FIG. 1. From a control function standpoint, the print data will first arrive at a raster image processor 40, and then be sent to a print engine controller 50. In many printers, there is a separate ASIC for controlling the print raster imaging process and a separate ASIC for controlling the print engine. In many newer printers, the ASICs have become powerful enough that all of the elements that make up the rasterizer (image processor) and the print engine controller can be placed into a single ASIC package. The processing circuit and memory circuit elements may, or may not, be resident on the ASIC.

The print engine controller 50 will control a physical print engine 52, which will typically include a photosensitive image-forming device, such as a photoconductive drum or a photoconductive belt. On FIG. 1, a photoconductive element (e.g., a cylindrical drum) receives modulated laser light on a surface area that becomes an image-forming region 120, which is described in greater detail in connection with FIG. 2. A latent image is thus formed on this surface by virtue of the modulated laser light discharging certain areas of the photoconductive element. This latent image will attract an image-forming material such as toner, and the image-forming material is then transferred to some type of print media. The physical output from the print engine 52 is a sheet of the print media (e.g., paper), generally designated by the reference numeral 60.

It should be noted that much of the control logic needed for controlling the functions of the printing process and the sheet media movements of a printer can be off-loaded to a physically separate processing circuit, or to a virtual processing device. For example, a host computer could send appropriate command signals directly to output switching devices (e.g., transistors or triacs) that reside on the printer main body; the host computer could also directly receive input signals from various sensors on the printer main body, to facilitate the control logic that is resident on such a host computer. Thus the control logic (or a portion thereof) of a printing device need not always be part of the physical printer, but may be resident in another physical device, or perhaps be virtual. In reference to FIG. 1, the microprocessor 14 may not have to reside within the printer 10, but instead could be replaced by a set of electrical or optical command signal-carrying and data signal-carrying pathways (e.g., a set of parallel electrical conductors or fiber optic channels).

Figure 2:
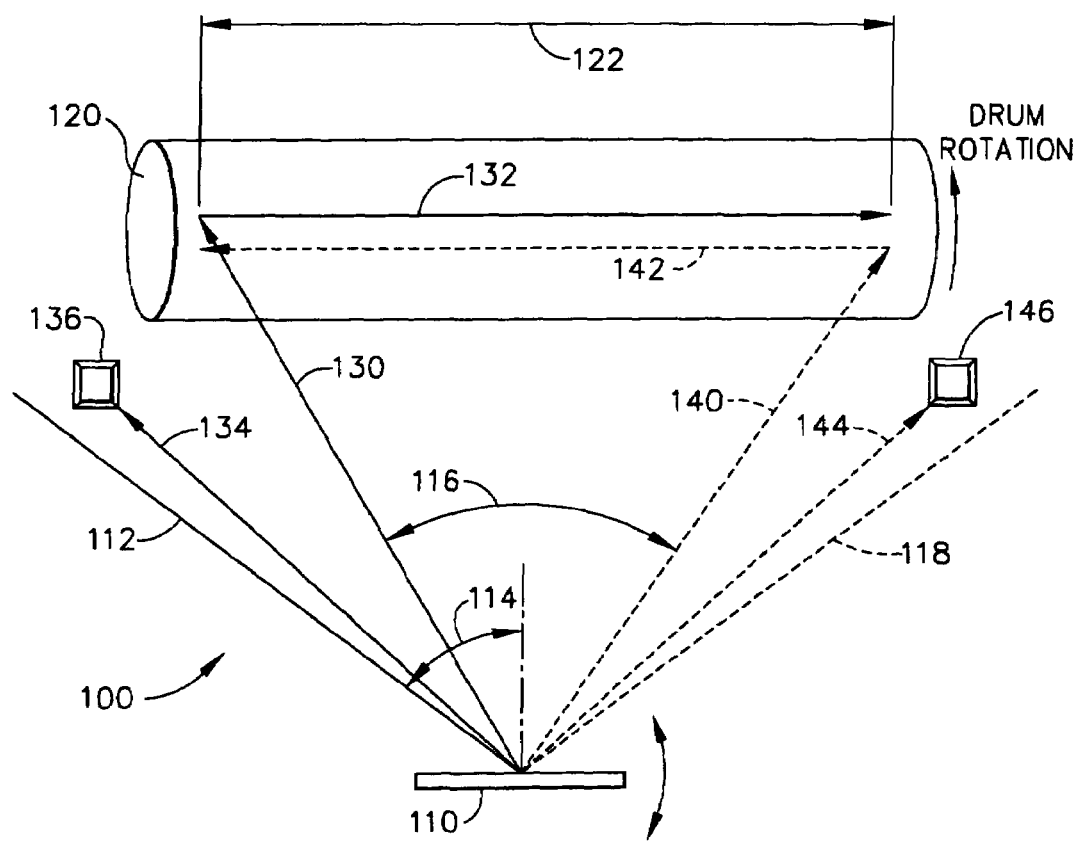
FIG. 2 is a diagrammatic view of a bi-directional galvanometer-based laser print engine that has two optical sensors, as constructed according to the principles of the present invention.

Referring now to FIG. 2, a print engine for a bi-directional galvanometer-based laser printer is depicted, generally designated by the reference numeral 100. A reflecting galvanometer 110 pivots about a central axis, in which that axis is perpendicular with respect to the surface plane of the drawing of FIG. 2. As the galvanometer pivots, it has an angular limit of motion that is depicted by the angle 114. A laser beam of light that is directed toward the galvanometer 110 can then sweep across a photoconductive drum 120, including from the line 112 through the arc depicted by the angle 116, which strikes the photoconductive drum 120. The imaging region of the PC drum 120 is depicted at the reference numeral 122.

In FIG. 2, the solid lines illustrate some of the various pathways of the laser beam as the galvanometer begins to begin to pivot clockwise after having reached its maximum counterclockwise angular displacement (along the line 112). As such, the galvanometer motion corresponds to a "forward" print scan in this illustrated example of FIG. 2, which will result in a laser beam sweep across the photoconductive drum along the line 132. This sweep will also include a laser beam pathway at 134, which will impact a light-detecting sensor 136, such as a photodiode or a phototransistor (also referred to herein as a "photosensor").

As the laser beam sweeps in the forward direction (as defined in this drawing of FIG. 2), it will impact photosensor 136, which can be used as a "horizontal" synchronizing sensor, also sometimes referred to as the "HSYNC" sensor. As the laser beam continues to sweep, it will also begin impacting the photoconductive drum in the imaging region 122 along the laser beam pathway at 130. This forward sweep impacts the PC drum 120 at 132, as noted above.

After the forward sweep has been completed, the galvanometer 110 will continue its motion and reach its maximum clockwise angular displacement, and then will begin to pivot in a counterclockwise direction. This counterclockwise motion corresponds to a "reverse" print scan in this example of FIG. 2, which is depicted in the dashed lines. As the laser beam sweeps in the counterclockwise direction, it will impact a second photosensor 146 and continue until it impacts the photoconductive drum 120, and will thereby lay a reverse print scanline 142 on PC drum 120. As the galvanometer pivots in the counterclockwise direction, the laser beam pathway will start at its maximum clockwise position along a dashed line 118, impact the photosensor 146 along a pathway 144, and then continue to a dashed line 140 where it begins writing on the imaging region 122 of the PC drum 120.

Each of these photosensors 136 and 146 will be illuminated twice during each back-and-forth motion of the galvanometer 110. The laser beam will illuminate the sensor 136 as it is about to start tracing its forward path across the PC drum 120, and the resulting sensor pulse is the forward "start-of-scan" (SOS) signal, that is also sometimes referred herein to as the horizontal synchronizing signal (HSYNC). The laser beam will later illuminate the other sensor 146 near the end of scan portion of this forward sweep, as the laser beam moves beyond the print region 122, resulting in a forward "end-of-scan" (EOS) sensor pulse signal. During the laser beam's reverse motion across the drum, the start-of-scan (SOS) pulse will occur as the laser beam strikes the photosensor 146, and then after the laser beam sweeps across the photosensitive print region 122 it will strike the other photosensor 136, resulting in a reverse EOS sensor pulse.

Figure 3:
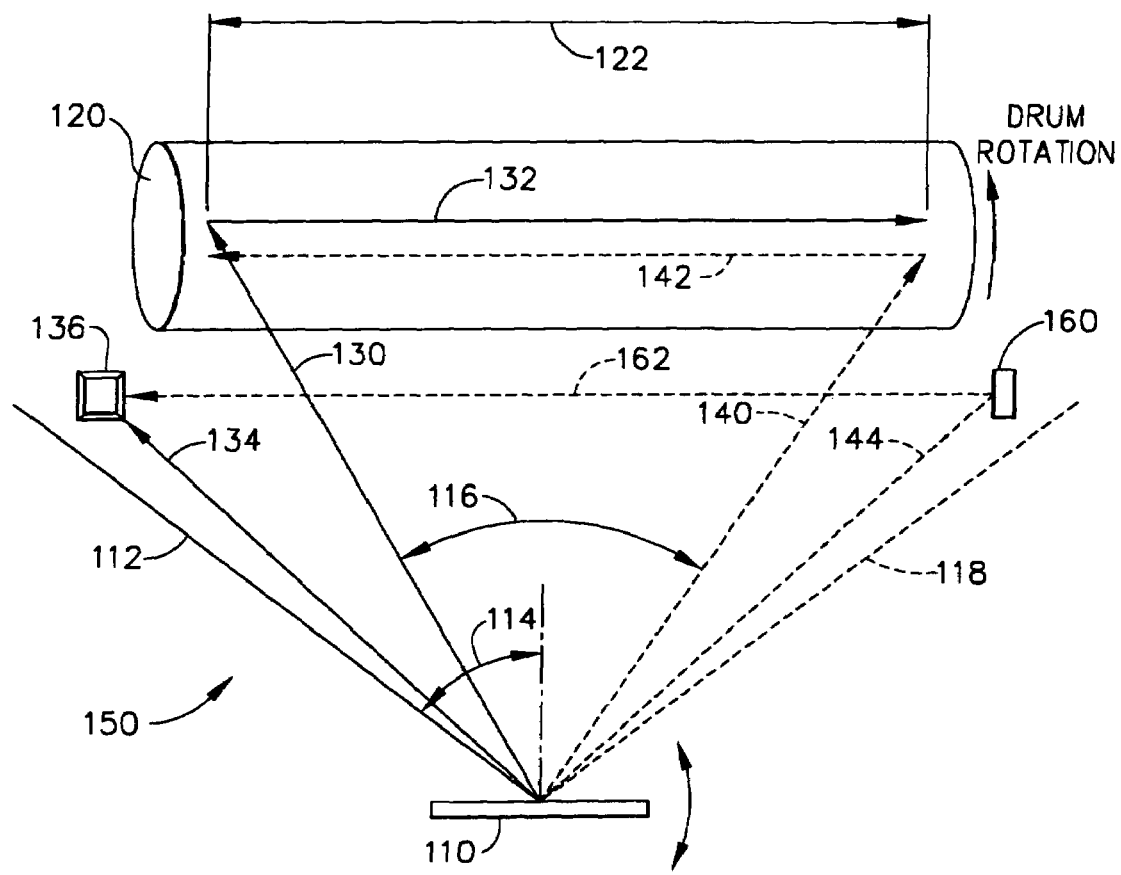
FIG. 3 is a diagrammatic view of a bi-directional galvanometer-based laser print engine similar to that of FIG. 2, except that a mirror has been substituted for one of the optical sensors.

Referring now to FIG. 3, a similar print engine is depicted, generally designated by the reference numeral 150. Print engine 150 also is a bi-directional galvanometer-based laser printer, including a pivotable galvanometer 110 that has an angular limit along the angle 114, in a similar manner to that depicted in FIG. 2. The main difference between FIGS. 2 and 3 is that the second photosensor 146 of FIG. 2 has been replaced by a mirror 160 in FIG. 3. In this alternative embodiment of FIG. 3, the print engine 150 only requires a single photosensor 136. During the reverse print scans, the laser beam that travels along the pathway 144 will impact the mirror 160, and then be re-directed along a pathway 162 until it impacts the photosensor 136. In this manner, the single photosensor 136 acts as the HSYNC sensor for all scans, i.e., both forward print scans and reverse print scans.

The single sensor 136 will be illuminated four times during each back-and-forth motion of the galvanometer 110. The laser beam will illuminate the sensor 136 as it is about to start tracing its forward path across the PC drum 120. The resulting sensor pulse signal is the forward SOS (start-of-scan) pulse. The laser beam will illuminate the same sensor 136 again via the mirror 160, as the beam moves beyond the print region 122, thereby resulting in a forward EOS (end-of-scan) sensor pulse signal. During the laser beam's reverse motion, the sensor 136 will be illuminated via the mirror 160 to produce a reverse SOS (start-of-scan) sensor pulse signal, then the beam will sweep across the print region 122. The laser beam will illuminate the sensor directly again as it moves beyond the print region, resulting in a reverse EOS (end-of-scan) sensor pulse signal.

The other components depicted on FIG. 3 can be identical to those depicted on FIG. 2, if desired. Of course, minor alterations to these components, or their exact physical positions, can be made without departing from the principles of the present invention.

Figure 4:
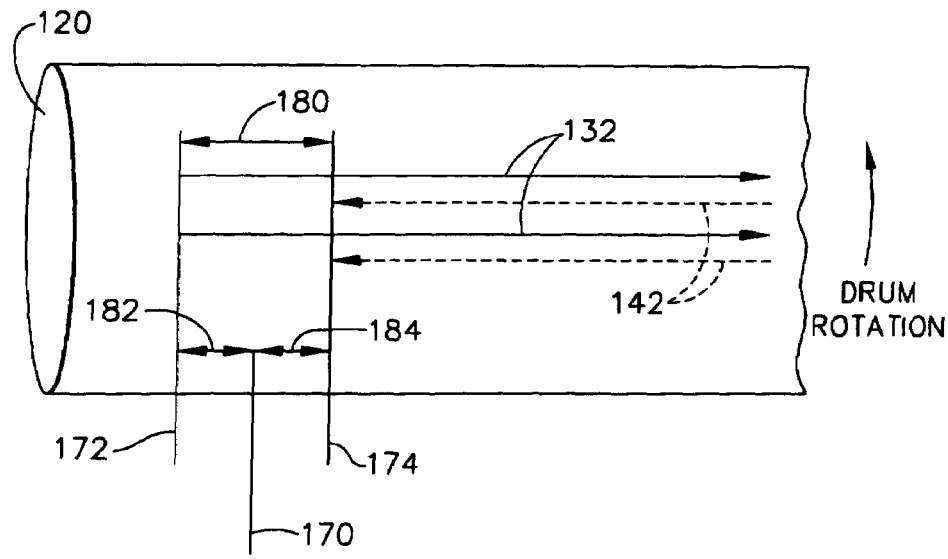
FIG. 4 is a magnified diagrammatic view of a portion of the laser print engine of FIG. 2, showing the effects of margin misalignment.

Referring now to FIG. 4, a magnified view of a portion of the PC drum 120 is illustrated to more readily show the effects of a misalignment of the margin between scanlines that will occur when the operating laser power of the print engine is greater than that used at the time the printer's initial margins were set at the factory. The time delay between when the laser beam first illuminates the photosensor and when the photosensor issues an output pulse is reduced because the higher laser power will make the photosensor reach its switching threshold sooner. Therefore, the laser beam's physical position is closer to the edge of the PC drum when the sensor pulse occurs, regardless of the direction that the laser beam is sweeping. This can create the misalignment between forward and reverse print scans.

In FIG. 4, the start of forward scans and the end of reverse scans using nominal laser power is illustrated at the position designated by the reference numeral 170. The start of forward scans using a higher laser power than the nominal laser power is illustrated at the position 172, which then results in a spatial deviation or displacement on the PC drum indicated at the reference numeral 182. The end of reverse scans that use higher than nominal laser power is indicated at the reference numeral 174, which then results in a spatial deviation or displacement on the PC drum, indicated by the reference numeral 184. Thus the total image misalignment due to increased laser power relative to its nominal value is indicated at the distance 180 on FIG. 4.

The forward print scans are indicated at the solid lines at reference numerals 132 on FIG. 4, while the reverse print scans are indicated by the dashed lines at 142. All of the forward scanlines 132 should begin along the position 170 in a perfect world, based on the nominal laser power when the printer was initially set up in the factory. This position 170 would also be the nominal end of scanline for the reverse scanlines 142, again in a perfect world using the nominal laser power based on the printer's initial setup in the factory.

If, for example, the actual laser power was reduced as compared to the nominal laser power used for the printer's factory set-up, then the start-of-scan would be closer to the position 174, i.e., to the right of the nominal position 170 on FIG. 4. This would also result in the end of scan for the reverse print scans being closer to the position 172 on FIG. 4, i.e., to the left of the nominal position 170.

To compensate for the deviations due to variations in the laser power level relative to its nominal value upon factory set-up, the present invention can determine the appropriate amount of margin compensation that should be applied. A flow chart 200 is provided on FIG. 5, and its first step 210 is to set the laser power to its desired level for the appropriate print darkness levels, etc., as per user settings and environmental conditions. A step 212 will now determine the appropriate margin compensation factors that should be applied, based on the difference between the present laser power level and the nominal laser power level that was in use when the nominal margin settings were set up at the factory. Finally, a step 214 applies the margin compensation factors to the nominal margin settings, thus causing the laser to turn on (if necessary) either somewhat before or after its nominal "time" that would normally have it begin a scanline at the position 170 on FIG. 4, for example.

Figure 5:
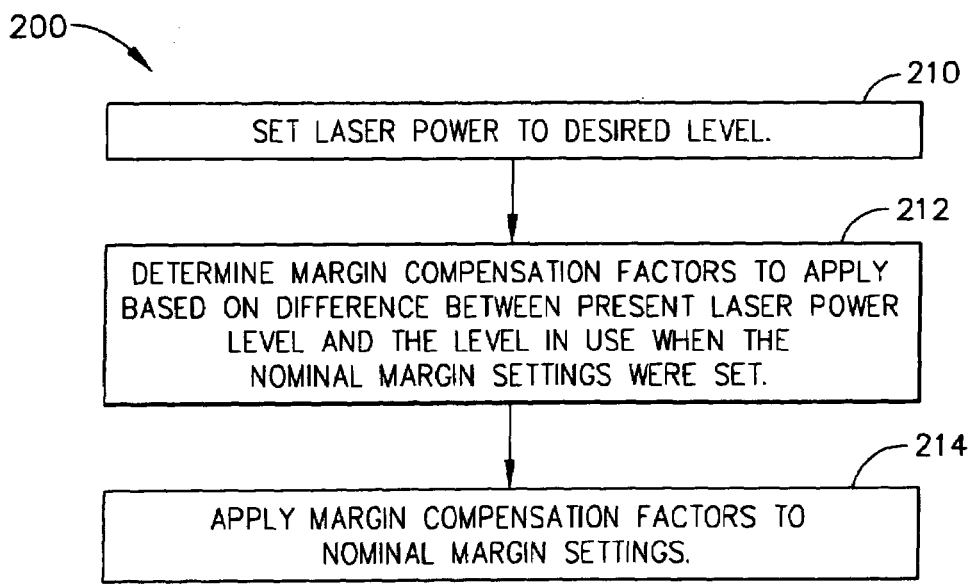
FIG. 5 is a flow chart of some of the logical steps used in the present invention to compensate for misalignments in the margin due to different power settings of the laser of the print engine of FIG. 2.

When using the flow chart of FIG. 5, the determination of the margin compensation factors can be performed in more than one way. A multiple-value lookup table could be used; or a fairly coarse set of compensation values could be stored (e.g., in a table or file) and used with interpolation, for example. In addition, a mathematical formula based upon experimental data could be used. Moreover, a combination of a lookup table, with or without interpolation, and mathematical formula could be used, if desired.

The following example illustrates the effect the difference in the start-of-scan signal moment has on image alignment. If an increase in laser power with respect to the nominal power causes the printing system to see the forward and reverse SOS signals ten nanoseconds (10 ns) sooner than in the nominal case, then this time interval translates to roughly two-thirds of a pixel in a forty-seven ppm (pages per minute) bi-directional galvanometer-based laser printer. The receiving of each SOS signal ten ns sooner than in the nominal case shifts the forward scans to the left by ⅔ of a pixel, and shifts the reverse scans to the right by ⅔ of a pixel. This results in a total image misalignment between scanlines equal to ⅘ of a pixel.

In one mode of the present invention, the raster imaging system calculates the amount of image shift expected due to the difference in laser power between the desired laser power value and the nominal laser power value. The calculation is based on the difference between these laser power settings. The raster image system then applies appropriate offsets to the nominal margin settings to compensate for the expected shift. In the above example, the raster imaging system would increase each margin setting by ⅔ of a pixel in order to place the first pixel of each scan in the same physical position as it would have been, had the desired laser power been equal to the nominal laser power value. The result is a properly aligned image.

A decrease in the laser power will shift the scans in the opposite direction, so that the offsets applied by the raster image system processor would be negative as compared to the case described above, in which the laser power was increased above the nominal amount.

The raster image processing system could use a lookup table to determine the expected amount of image shift and then apply offsets to the margin settings to compensate for the expected shift needed to re-align the image. The values stored in the lookup table could be determined empirically by testing the photosensor's threshold characteristics at multiple different laser power settings. This testing could be accomplished once for an entire production line for a single model printer, or for increased accuracy, the testing could be done for each individual printer. In general, a specific type of print engine that uses a single type of photosensor and laser light source would exhibit sufficient repeatability between physical units so as to not need an individual "customized" lookup table (or equations) per individual printer.

It will be understood that the term "print media" herein refers to a sheet or roll of material that has toner or some other "printable" material applied thereto by a print engine, such as that found in a laser printer, or other type of electrophotographic printer. Alternatively, the print media represents a sheet or roll of material that has ink or some other "printable" material applied thereto by a print engine or printhead, such as that found in an ink jet printer, or which is applied by another type of printing apparatus that projects a solid or liquified substance of one or more colors from nozzles or the like onto the sheet or roll of material. Print media is sometimes referred to as "print medium," and both terms have the same meaning with regard to the present invention, although the term print media is typically used in this patent document. Print media can represent a sheet or roll of plain paper, bond paper, transparent film (often used to make overhead slides, for example), or any other type of printable sheet or roll material.

It will also be understood that the logical operations described in relation to the flow chart of FIG. 5 can be implemented using sequential logic, such as by using microprocessor technology, or using a logic state machine, or perhaps by discrete logic; it even could be implemented using parallel processors. One preferred embodiment may use a microprocessor or microcontroller (e.g., microprocessor 14) to execute software instructions that are stored in memory cells within an ASIC (Application Specific Integrated Circuit). In fact, the entire microprocessor 14 (or a microcontroller, for that matter) along with dynamic RAM and executable ROM may be contained within a single ASIC, in one mode of the present invention. Of course, other types of circuitry could be used to implement these logical operations depicted in the drawings without departing from the principles of the present invention.

It will be further understood that the precise logical operations depicted in the flow chart of FIG. 5, and discussed above, could be somewhat modified to perform similar, although not exact, functions without departing from the principles of the present invention. The exact nature of some of the decision steps and other commands in this flow chart are directed toward specific future models of bi-directional printer systems (those involving galvanometer-based Lexmark printers, for example) and certainly similar, but somewhat different, steps would be taken for use with other types of bi-directional printing systems in many instances, with the overall inventive results being the same.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A method for compensating for image misalignment in a bi-directional electrophotographic image forming system, said method comprising:
   (a) providing a processing circuit and a memory circuit for controlling an image forming apparatus, said image forming apparatus having: (i) a light source that generates a moving light beam that scans across an imaging area of a photosensitive image forming surface, said imaging area having a first edge and a second, opposite edge in at least one scanning direction, and (ii) at least one light-detecting sensor that receives said moving light beam at a location other than at said image forming surface;
   (b) storing data in said memory circuit corresponding to a first nominal margin of said photosensitive image forming surface, in which said first nominal margin corresponds to a nominal power setting for said light source, and in which said first nominal margin is related to a first time interval between: (i) when a first electrical signal is output from said at least one light-detecting sensor as it is stimulated by said moving light beam traveling in a first scanning direction of said at least one scanning direction; and (ii) when said first edge of said imaging area is reached by said moving light beam, while traveling in said first scanning direction;
   (c) storing data in said memory circuit corresponding to a second nominal margin of said photosensitive image forming surface, in which said second nominal margin corresponds to said nominal power setting for said light source, and in which said second nominal margin is related to a second time interval between: (i) when a second electrical signal is output from said at least one light-detecting sensor as it is stimulated by said moving light beam, traveling in a second scanning direction of said at least one scanning direction, which is substantially opposite said first scanning direction; and (ii) when said second, opposite edge of said imaging area is reached by said moving light beam, while traveling in said second scanning direction;
   (d) determining compensating data to be used with said first and second nominal margins, when said light source is operating at a power setting other than said nominal power setting; and
   (e) when needed, applying said compensating data to said first nominal margin to generate a first corrected margin, and applying said compensating data to said second nominal margin to generate a second corrected margin.

2. The method as recited in claim 1, wherein: (a) said first corrected margin substantially aligns in a sub-scanning direction for a plurality of scanlines created by said moving light beam in both said first scanning direction and in said second scanning direction; and (b) said second corrected margin substantially aligns in said sub-scanning direction for said plurality of scanlines created by said moving light beam in both said first scanning direction and in said second scanning direction.

3. The method as recited in claim 2, wherein: (a) said light source is modulated by being serially energized and de-energized according to image data, such that a predetermined pattern of light-impacted regions are formed on the imaging area of said photosensitive image forming surface as the moving light beam scans across said imaging area in said first and second scanning directions; and (b) said light source is energized when said moving light beam is directed at said at least one light-detecting sensor.

4. The method as recited in claim 3, wherein said first and second scanning directions are substantially parallel to one another, and to at least one direction of said plurality of scanlines being created on said photosensitive image forming surface.

5. The method as recited in claim 4, wherein said sub-scanning direction is substantially perpendicular to said first and second scanning directions.

6. The method as recited in claim 1, wherein said compensating data is in a form of predetermined information stored in a lookup table, which is accessed as needed, in real time.

7. The method as recited in claim 1, wherein said compensating data is in a form of a predetermined mathematic function that performs a calculation as needed, in real time, to generate said compensating data.

8. The method as recited in claim 1, wherein said compensating data causes said first and second corrected margins to decrease as compared to said first and second nominal margins, when said other power setting has increased above said nominal power setting.

9. The method as recited in claim 1, wherein said compensating data causes said first and second corrected margins to increase as compared to said first and second nominal margins, when said other power setting has decreased below said nominal power setting.

10. The method as recited in claim 1, wherein said image forming apparatus comprises a galvanometer-based laser print engine.

11. The method as recited in claim 1, wherein said at least one light-detecting sensor comprises one of: (a) a first sensor and a second sensor; and (b) a first sensor and a mirror.

12. An image forming system, comprising:
   (a) a light source that generates a moving light beam which scans across an imaging area of a photosensitive image forming surface, said imaging area having a first edge and a second, opposite edge in at least one scanning direction;
   (b) at least one light-detecting sensor that receives said moving light beam at a location other than at said image forming surface;
   (c) a memory circuit for storing data that corresponds to a first nominal margin of said photosensitive image forming surface, in which said first nominal margin corresponds to a nominal power setting for said light source, and in which said first nominal margin is related to a first time interval between: (i) when a first electrical signal is output from said at least one light-detecting sensor as it is stimulated by said moving light beam traveling in a first scanning direction of said at least one scanning direction; and (ii) when said first edge of said imaging area is reached by said moving light beam, while traveling in said first scanning direction;
   (d) said memory circuit also being configured for storing data that corresponds to a second nominal margin of said photosensitive image forming surface, in which said second nominal margin corresponds to said nominal power setting for said light source, and in which said second nominal margin is related to a second time interval between: (i) when a second electrical signal is output from said at least one light-detecting sensor as it is stimulated by said moving light beam, traveling in a second scanning direction of said at least one scanning direction, which is substantially opposite said first scanning direction; and (ii) when said second, opposite edge of said imaging area is reached by said moving light beam, while traveling in said second scanning direction; and
   (e) a processing circuit that is configured:
      (i) to determine compensating data to be used with said first and second nominal margins, if said light source is operating at a power setting other than said nominal power setting; and
      (ii) when needed, to apply said compensating data to said first nominal margin to generate a first corrected margin, and to apply said compensating data to said second nominal margin to generate a second corrected margin.

13. The image forming system as recited in claim 12, wherein said processing circuit is physically located at one of: (a) said image forming apparatus, and (b) a separate computing apparatus.

14. The image forming system as recited in claim 12, wherein: (a) said first corrected margin substantially aligns in a sub-scanning direction for a plurality of scanlines created by said moving light beam in both said first scanning direction and in said second scanning direction; and (b) said second corrected margin substantially aligns in said sub-scanning direction for said plurality of scanlines created by said moving light beam in both said first scanning direction and in said second scanning direction.

15. The image forming system as recited in claim 14, wherein: (a) said light source is modulated by being serially energized and de-energized according to image data, such that a predetermined pattern of light-impacted regions are formed on the imaging area of said photosensitive image forming surface as the moving light beam scans across said imaging area in said first and second scanning directions; and (b) said light source is energized when said moving light beam is directed at said at least one light-detecting sensor.

16. The image forming system as recited in claim 15, wherein said first and second scanning directions are substantially parallel to one another, and to at least one direction of said plurality of scanlines being created on said photosensitive image forming surface.

17. The image forming system as recited in claim 16, wherein said sub-scanning direction is substantially perpendicular to said first and second scanning directions.

18. The image forming system as recited in claim 12, wherein said compensating data is in a form of predetermined information stored in a lookup table, which is accessed as needed, in real time.

19. The image forming system as recited in claim 12, wherein said compensating data is in a form of a predetermined mathematic function that performs a calculation as needed, in real time, to generate said compensating data.

20. The image forming system as recited in claim 12, wherein said compensating data causes said first and second corrected margins to decrease as compared to said first and second nominal margins, when said other power setting has increased above said nominal power setting.

21. The image forming system as recited in claim 12, wherein said compensating data causes said first and second corrected margins to increase as compared to said first and second nominal margins, when said other power setting has decreased below said nominal power setting.

22. The image forming system as recited in claim 12, wherein said image forming system includes a galvanometer-based laser print engine.

23. The image forming system as recited in claim 12, wherein said at least one light-detecting sensor comprises one of: (a) a first sensor and a second sensor; and (b) a first sensor and a mirror.

* * * * *